(12) United States Patent
Burton et al.

(10) Patent No.: US 6,425,051 B1
(45) Date of Patent: Jul. 23, 2002

(54) METHOD, SYSTEM, PROGRAM, AND DATA STRUCTURES FOR ENABLING A CONTROLLER ACCESSING A STORAGE DEVICE TO HANDLE REQUESTS TO DATA IN A FIRST DATA FORMAT WHEN THE STORAGE DEVICE INCLUDES DATA IN A SECOND DATA FORMAT

(75) Inventors: David Alan Burton, Vail; Robert Louis Morton, Tucson, both of AZ (US)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 09/669,782

(22) Filed: Sep. 25, 2000

(51) Int. Cl.$^7$ .......................... G06F 12/00; G06F 15/00
(52) U.S. Cl. .......................... 711/113; 711/112; 703/23; 712/32
(58) Field of Search ................................ 711/113, 112, 711/111, 100, 202; 703/23, 27; 360/48; 395/500; 712/32

(56) References Cited

U.S. PATENT DOCUMENTS

| | | | |
|---|---|---|---|
| 5,206,939 A | | 4/1993 | Yanai et al. ..................... 711/4 |
| 5,388,013 A | | 2/1995 | Nakamura .................... 360/48 |
| 5,428,801 A | * | 6/1995 | Murano et al. ................ 712/32 |
| 5,515,525 A | * | 5/1996 | Grynberg et al. ............. 703/27 |
| 5,521,903 A | | 5/1996 | English et al. .............. 370/248 |
| 5,535,372 A | | 7/1996 | Benhase et al. .............. 703/23 |
| 5,579,474 A | | 11/1996 | Kakuta et al. .................. 714/6 |
| 5,664,144 A | | 9/1997 | Yanai et al. ................. 711/113 |
| 5,758,125 A | * | 5/1998 | Misinai et al. ................. 703/23 |
| 6,041,386 A | | 3/2000 | Bello ............................. 711/4 |
| 6,041,391 A | | 3/2000 | Kanda et al. ................ 711/112 |
| 6,049,890 A | | 4/2000 | Kakuta et al. .................. 714/6 |

OTHER PUBLICATIONS

US 5,907,858, 5/1999, Kanda et al. (withdrawn)

* cited by examiner

*Primary Examiner*—Do Hyun Yoo
*Assistant Examiner*—Kimberly N. McLean
(74) *Attorney, Agent, or Firm*—David W. Victor; Konrad Raynes Victor & Mann LLP

(57) ABSTRACT

Provided are a system, method, program, and data structure for processing a request for data in a first format that is superimposed on blocks of data stored in a second format in a storage device. A data structure for a storage unit in the first format including the requested data is accessed. There is one data structure for each storage unit in the first format being accessed. Further, at least one cache page storing blocks of data in the second format is needed to store one storage unit in the first format. A determination is made of one or more storage blocks in the second format that include the requested data. A determination is also made as to whether the storage unit data structure includes a pointer to a control block for a cache page that would include the determined storage blocks in the second format. The determined pointer and a request for the determined storage blocks is transferred to a component that is capable of accessing storage blocks in the second format in cache using the control block if the storage unit data structure includes a pointer to the control block.

34 Claims, 6 Drawing Sheets

METHOD, SYSTEM, PROGRAM, AND DATA STRUCTURES FOR ENABLING A CONTROLLER ACCESSING A STORAGE DEVICE TO HANDLE REQUESTS TO DATA IN A FIRST DATA FORMAT WHEN THE STORAGE DEVICE INCLUDES DATA IN A SECOND DATA FORMAT

BACKGROUND OF THE INVENTION

1. Field of the Invention

The present invention relates to a method, system, program, and data structures for enabling a controller receiving a request for data in a first format to handle I/O requests for data in a second format.

2. Description of the Related Art

Many mass storage devices, such as a Direct Access Storage Device (DASD), store data in a Count-Key-Data ("CKD") data format. A count field provides the name and format of a record, the key length, and the data length. The key field, which is optional, is used for searching and may indicate the last data set in the record. The data field provides a variable length record of user data sets. The number of CKD records that can be placed on a track depends on the length of the data areas of the records. Systems that store data in a CKD format often utilize a high-end storage controller device to interface between an application or host system and the DASD, such as the International Business Machines Corporation (IBM) 3990 and Enterprise System Storage Server.**

The fixed block architecture (FBA) data storage format stores data in blocks of a fixed size. These blocks are addressed by a block number relative to the beginning of the file. An FBA block is referred to as a sector, which is addressable by the host. The FBA data storage format is the ubiquitous data storage format used in most personal computer and server storage devices. FBA data is accessed by devices and controllers using the Small Computer System Interface (SCSI). Because of the prevalence of SCSI/FBA systems, there are a greater range of low to middle end server machines that utilize the SCSI FBA format than high end machines maintaining data in the CKD format.

The prior art provides systems for emulating the CKD format on FBA devices and for converting CKD formatted records to the FBA format. Such systems are disclosed and discussed in U.S. Pat. Nos. 5,535,372 and 6,041,386, which are assigned to IBM, the assignee of the present application, and are incorporated herein by reference in its entirety. Still further, data in the CKD format is typically written and imposed onto the fixed blocks of an FBA device, as discussed in U.S. Pat. Nos. 5,535,372 and 5,664,144. In such case, the data area of a CKD record can span multiple fixed blocks or sectors in the FBA device. U.S. Pat. No. 5,664,144 to Moshe Yanai et al. is assigned to EMC corporation, and is incorporated herein by reference in its entirety.

Notwithstanding that CKD data can be stored on FBA devices, additional specialized hardware needs to be provided to allow a SCSI device to handle CKD data.

Thus, there is a need in the art for an improved technique for enabling a SCSI FBA device handle CKD data.

SUMMARY OF THE PREFERRED EMBODIMENTS

To overcome the limitations in the prior art described above, preferred embodiments disclose a system, method, program, and data structure for processing a request for data in a first format that is superimposed on blocks of data stored in a second format in a storage device. A data structure for a storage unit in the first format including the requested data is accessed. There is one data structure for each storage unit in the first format being accessed. Further, at least one cache page storing blocks of data in the second format is needed to store one storage unit in the first format. A determination is made of one or more storage blocks in the second format that include the requested data. A determination is also made as to whether the storage unit data structure includes a pointer to a control block for a cache page that would include the determined storage blocks in the second format. The determined pointer and a request for the determined storage blocks is transferred to a component that is capable of accessing storage blocks in the second format in cache using the control block if the storage unit data structure includes a pointer to the control block.

In certain embodiments, the first format comprises a count-key-data (CKD) format and the second format comprises the Small Computer System Interface (SCSI) format.

In further embodiments, the component capable of accessing storage blocks in the cache comprises a cache manager. In such case, a request for the determined storage blocks are transferred to the cache manager if the storage unit data structure does not include a pointer to the control block. The cache manager accesses the control block for the cache page that includes the requested data and uses the accessed control block to access the requested storage blocks from the cache page. The cache manager returns the accessed storage blocks.

Still further, the cache manger returns one pointer to the accessed control block providing information on the cache page including the requested data. The returned pointer is received and indication of the returned pointer is made in the storage unit data structure for subsequent use when subsequently accessing requested data in the first format in the page.

Preferred embodiments provide a technique for adding a layer of execution over a controller or current cache manager that handles data in a second format, such as SCSI, to handle I/O requests for data in a first format, such as the CKD format. With the preferred embodiments, the extra layer of code that provides the interface to the first data or CKD format uses the cache manager of the existing controller. In this way, a patch of code can be applied to current controllers managing data in a common data format, such as SCSI, to enable the controller to handle I/O requests to data in a different storage format, such as CKD.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
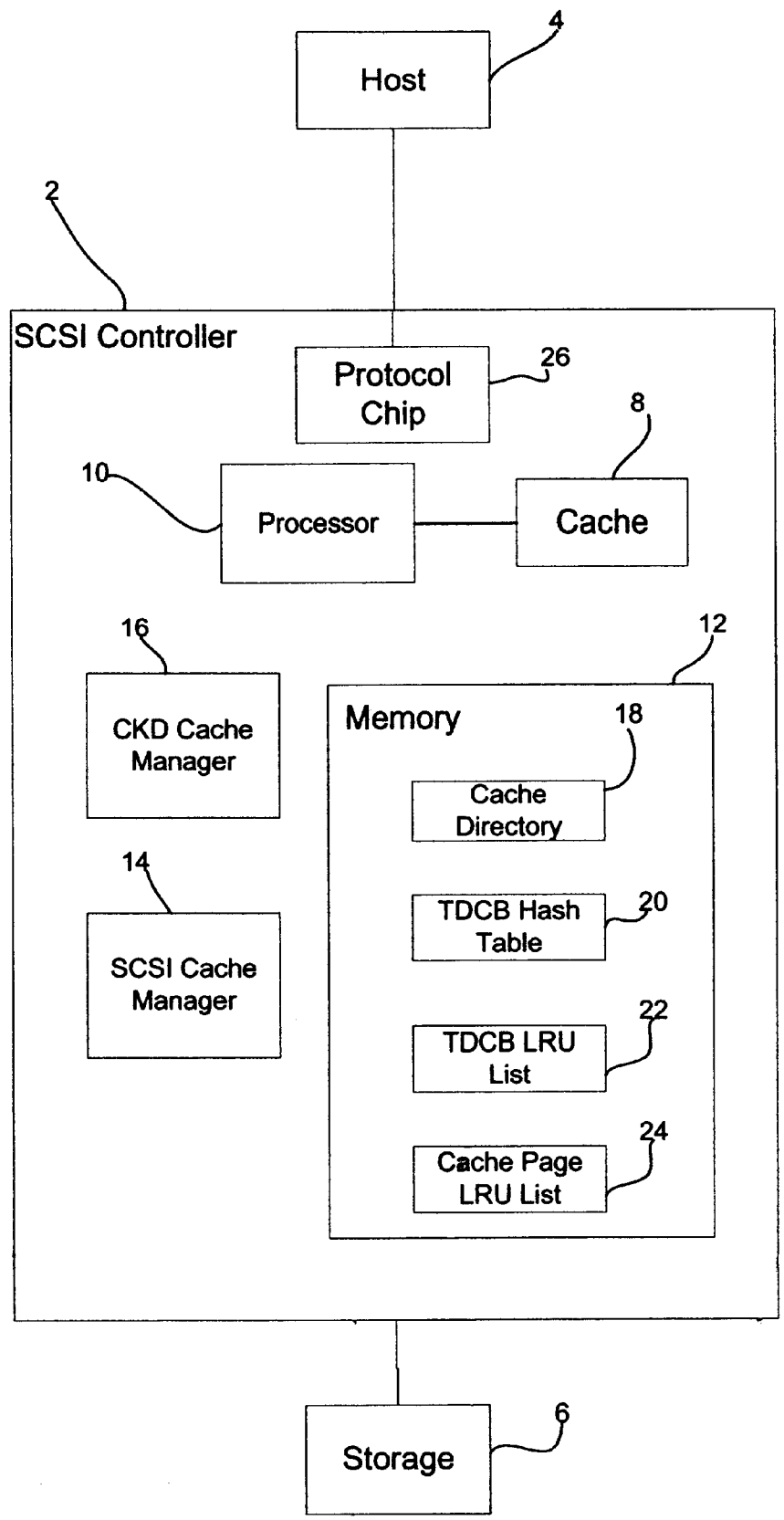
FIG. 1 illustrates a computing environment in accordance with the preferred embodiments of the present invention.

FIG. 1 illustrates a computing environment in which preferred embodiments are implemented. A SCSI controller 2 provides an interface between a host computer 4 and a storage device 6, such as a DASD. The SCSI controller 2 executes Input/Output (I/O) requests from the host 4 against the storage device 6 using the SCSI protocol. The SCSI controller 2 caches requested data from the storage device 6 in cache 8, which in preferred embodiments is a high-speed memory device managed by the SCSI controller 2. The SCSI controller 2 further includes a processor 10, memory 12, SCSI cache manager 14, and CKD cache manager 16. The SCSI 14 and CKD 16 cache managers include the code in which preferred embodiments are implemented. The cache managers 14 and 16 may be implemented as code embedded in a programmable memory device, such as a programmable read only memory (PROM), electrically erasable programmable read only memory (EEPROM), flash memory, or embedded in software on a hard disk or other storage medium that is loaded into memory 12 and executed, etc.

The memory 12 includes data structures that the SCSI 14 and CKD 16 cache managers use to manage I/O operations. The memory 12 includes a cache directory 18 the SCSI cache manager 14 uses to manage data in cache 8 and determine whether a requested LBA is within the cache 8 in a manner known in the art. If the requested LBA is in cache 8, then the SCSI cache manager 14 returns the data from cache 8. Otherwise, the SCSI cache manager 14 stages the requested LBA from the storage device 6 into cache 8 and creates an entry for the staged LBA in the cache directory 18.

The CKD cache manager 16 uses a Track Directory Control Block (TDCB) hash table 20 and TDCB LRU list 22. The CKD cache manager 16 program uses the TDCB hash table 20 and LRU list 22 to service I/O requests from the host 4 for CKD data. In preferred embodiments, the code used to implement the CKD cache manager 16 can be added to a standard SCSI controller device known in the art, via an update or during manufacture, to enable the SCSI controller 2 to service requests for CKD data without altering the SCSI controller operations and management of cache. Instead, the preferred embodiment CKD cache management code forms a layer that interfaces between CKD requests and the SCSI controller and cache manager.

The SCSI controller 2 further includes a protocol chip 26 for host 4 communication, such as a Fibre Connection (FICON) chip, that allows the SCSI controller 2 to handle both SCSI as well as CKD data transfer protocols with an attached host 4.

Figure 2:
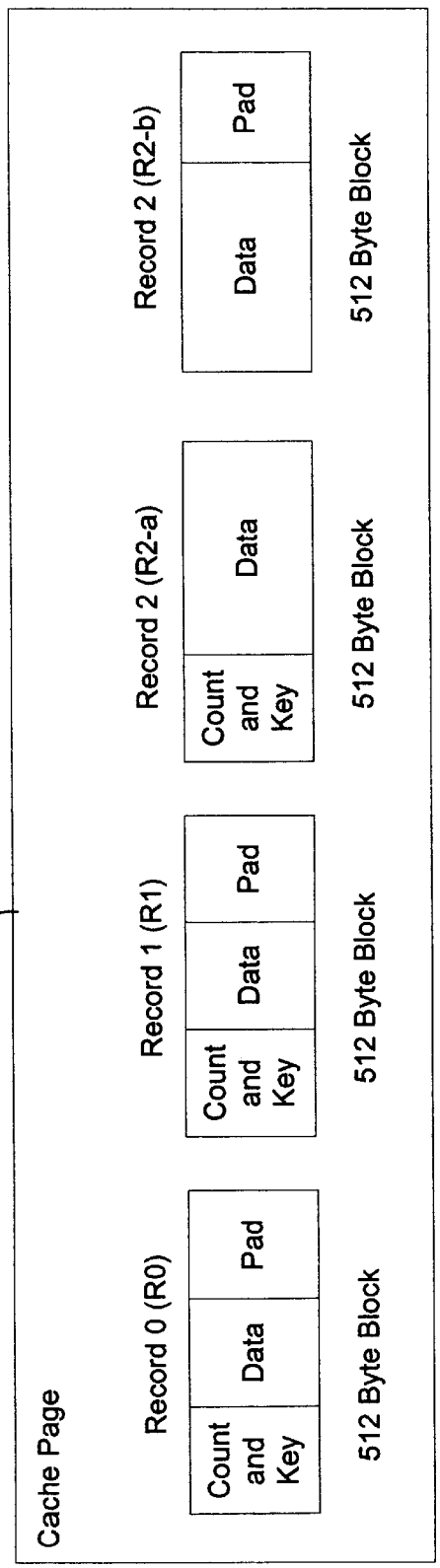
FIG. 2 illustrates how CKD tracks are superimposed over fixed block address (FBA) storage blocks in manner known in the art.

In preferred embodiments, the cache 8 stores data in cache pages containing a fixed number of 512 byte blocks, where each 512 byte block comprises an addressable LBA. For instance, an 8K byte cache page would have sixteen 512 byte blocks. The SCSI cache manager 14 stages LBAs from storage 6 into a page in cache 8. As discussed, CKD tracks are superimposed onto the fixed blocks identified as LBAs in a FBA storage device 6. FIG. 2 illustrates an example of a cache page 50 where CKD records 0, 1, and 2 are stored in 512 byte fixed blocks in the FBA storage device 6 in a manner known in the art. Records 0 and 1 each map to a separate 512 byte block having its own LBA. Record 2 data uses two 512 byte blocks. As discussed, CKD data records can be of varying length. Typically, a CKD track is approximately 56K bytes and resides in 112 contiguous 512 byte LBAs (56,000 bytes/512 byte 112). If a cache page is 8K, then 7 cache pages would be needed to hold a CKD track of 56K bytes. CKD records imposed on an FBA device may span multiple FBA block group boundaries, such as a cache page. Typically, a record starts on a FBA block boundary. However, individual FBA blocks may contain multiple CKD records.

Figure 3:
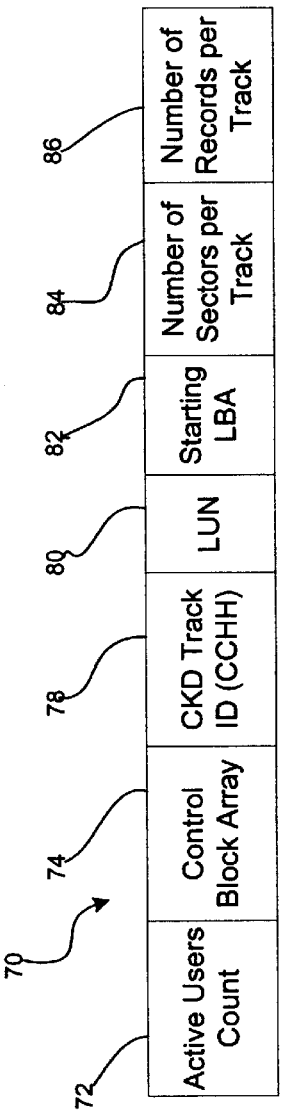
FIG. 3 illustrates fields of information maintained in a track directory control block data structure in accordance with preferred embodiments of the present invention.

The CKD cache manager 16 maintains a track directory control block (TDCB) data structure 70 for each CKD track staged into cache 8 to manage and respond to I/O requests for CKD records. In preferred embodiments, the cache control blocks (CCB) used to address a page in cache 8 include cache control block information known in the art, such as a bit map indicating the LUN and LBAs from storage 6 included in the page, which LBAs are actually staged into cache 8, and which LBAs in a cache page are modified. In preferred embodiments, the cache control block (CCB) for a cache 8 page further includes a pointer to the TDCB for the CKD track that is stored in the page. FIG. 3 illustrates the following fields in a TDCB 70 data structure.

Active users count 72: indicates the number of active user's accessing the CKD track. This field is used to prevent demoting a TDCB from the TDCB LRU list 22 when the CKD cache manager 16 is accessing the TDCB on behalf of one or more I/Os.

Control block array 74: An array including a value for each page assigned to the CKD track represented by the TDCB 70. The ith array value includes a pointer to the cache control block data structure for the tth page assigned to the CKD track. The cache control block data structure is a data structure used by the SCSI cache manager 14 that includes metadata on a page in cache 8. The cache control block typically includes a bit map indicating which LBAs are actually staged into cache 8. The control block further indicates which LBAs in a cache page are modified in a bitmap.

CKD Track ID 78: Identifies the CKD track the TDCB represents, including the cylinder and head (CCHH) of the track.

LUN 80: Indicates the logical volume or LUN of the FBA storage 6 in which the CKD track is stored.

Starting LBA 82: Indicates the LBA in the LUN 80 of the first record (R0) of the CKD track.

Number of Sectors Per Track 84: Indicates a number of sectors or LBAs included in the track.

Number of Records Per Track 86: Indicates the number of CKD records in the track.

Figure 4:
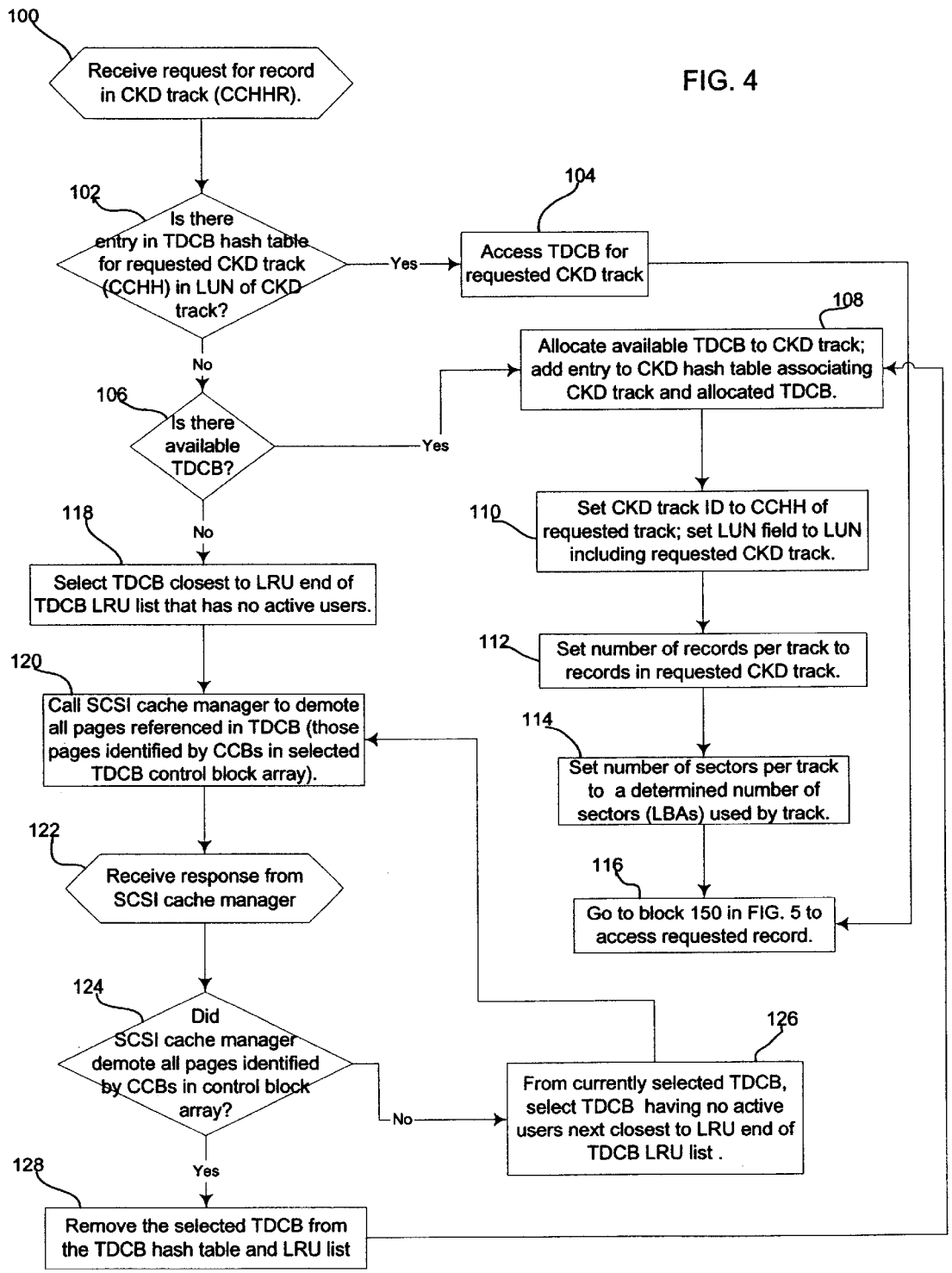
FIGS. 4 and 5 illustrate logic to process a request for a CKD track record in accordance with preferred embodiments of the present invention.
Figure 5:
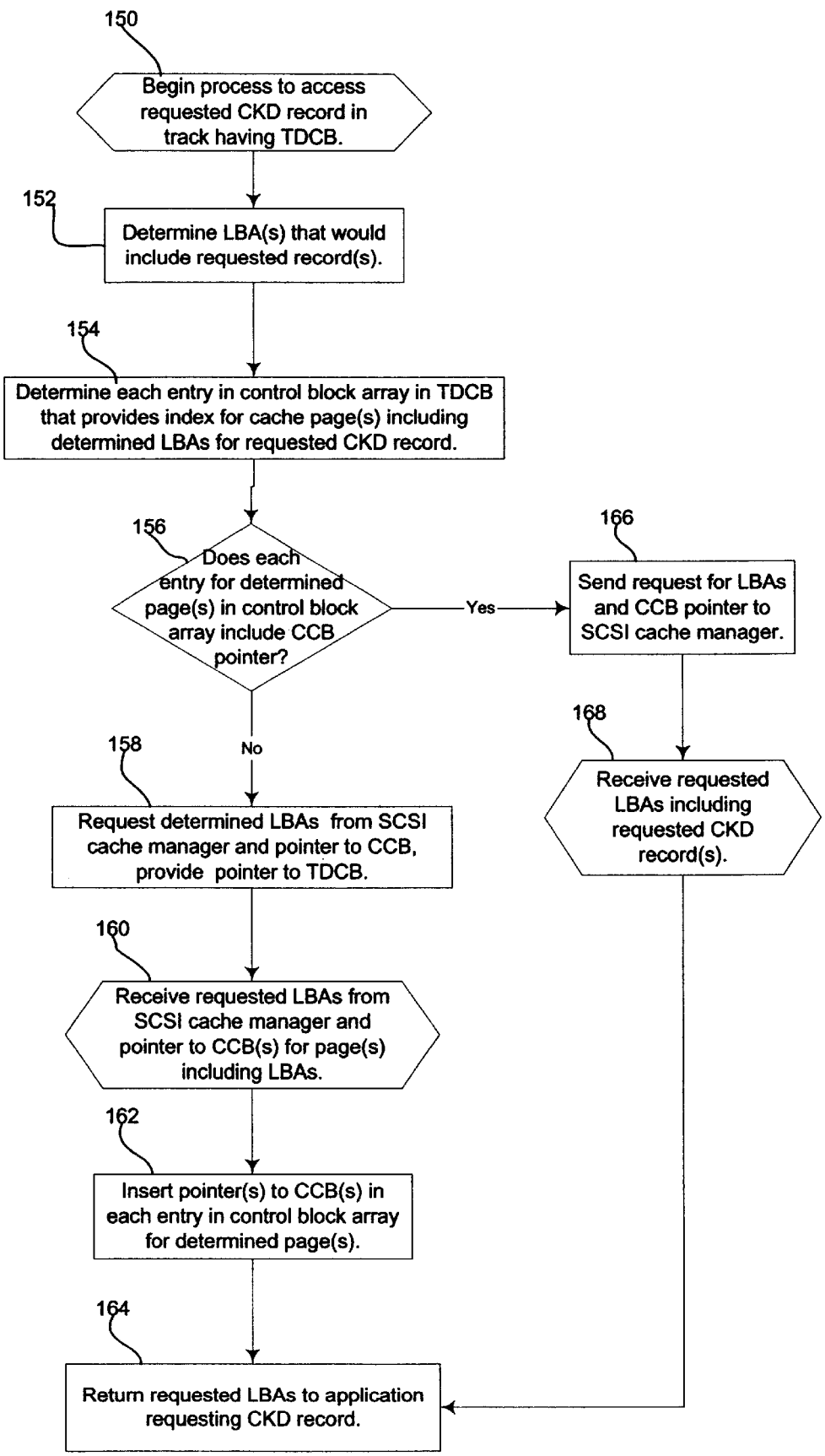

FIGS. 4 and 5 illustrate logic implemented in the CKD cache manager 16 to handle an I/O request for a CKD record, identified by a CCHHR (CC indicates the cylinder, HH indicates the head, and R indicates the record). This I/O requests is likely part of a chain of requests for records from a CKD track. With respect to FIG. 4, control begins at block 100 with the CKD cache manager 16 receiving a request for a record in a CKD track in a LUN of the storage device 6. The CKD cache manager 16 determines (at block 102) whether the TDCB hash table 20 includes an entry for the requested CKD track. The CKD cache manager 16 may apply a hash function to the CKD track ID and LUN to determine an entry in the TDCB hash table 20. If the hash function would map multiple CKD tracks to the same entry in the TDCB hash table 20, then the CKD cache manager 16 could further check the CKD track ID field 78 in the TDCB 70 in the determined entry in the TDCB hash table 20 against the requested CKD track ID (CCHH). If there is a match, then the CKD cache manager 16 would use that TDCB 70.

If there is no TDCB for the requested CKD track and there is no available TDCB (at block 106), then the CKD cache manager 16 selects (at block 118) a TDCB closest to the end of the TDCB LRU list 22 that has no active users, i.e., an active users count 72 of zero. The CKD cache manager 16 then calls (at block 120) the SCSI cache manager 14 to demote all pages identified by cache control blocks (CCBs) in the control block array 74 of the selected TDCB. If the response to the call (at block 122) indicates (at block 124) that the SCSI cache manager 14 demoted all pages identified in the provided cache control blocks (CCBs), then the CKD cache manager 16 removes (at block 128) the selected TDCB from the TDCB hash table 20 and the TDCB LRU list 22. If the response from the SCSI cache manager 14 indicates that not all identified pages were demoted when the requested page is being accessed, then the CKD cache manager 14 selects (at block 126) the next least recently used TDCB from the current TDCB that has no active users and returns to block 120. In this way, the CKD cache manager 16 will not demote a TDCB from the TDCB LRU list 22 having pages that were not demoted.

If (at block 106) there was an available TDCB, then the CKD cache manager 16 allocates (at block 108) that available TDCB and adds an entry to the TDCB hash table 20 associating the CKD track ID and the allocated TDCB. Alternatively, the CKD cache manager 16 could allocate (at block 108) a TDCB after removing one TDCB from the TDCB LRU list 22. In such case, the CKD cache manager 16 would add the allocated TDCB to the most recently used (MRU) end of the TDCB LRU list 22. After obtaining a TDCB 70 to use, the CKD cache manager 16 sets (at block 110) the CKD track ID field 78 to the ID for the requested CKD track and sets the LUN field 80 to the LUN including the requested CKD track. The number of records per track field 86 would be set (at block 112) to the total number of records in the requested CKD track. The CKD cache manager 16 could determine the number of records and sectors for the track from CKD track meta data if available or by staging the entire track into cache 8 and determining the number of records and sectors based on the track staged into cache 8. Further, the CKD cache manager 16 could determine the total number of fixed 512 byte blocks need to store the entire requested track in a manner known in the art and set (at block 114) the number of sectors per track field 84 to the determined number of fixed 512 byte blocks. Control then proceeds to block 116 to access the LBAs that include the requested CKD records. In addition, the CKD cache manager 16 increments the active users count 72 in the TDCB 70.

If (at block 102) there was an entry in the TDCB hash table 20 for the requested CKD track, then the CKD cache manager 16 accesses (at block 104) the TDCB for the requested CKD track and proceeds to block 150 in FIG. 5 to access the requested record in the CKD track. With respect to FIG. 5, at block 150, the CKD cache manager 16 begins the process to access the requested CKD record using the TDCB for the CKD track. The CKD cache manager 16 determines (at block 152) the LBAs in the LUN in the storage 6 that includes the requested CKD records. This determination can be made using CKD to LBA conversion techniques known in the art. The CKD cache manager 16 then determines (at block 154) the one or more cache page entries in the control block array 74 that include the LBAs determined at block 152. This determination can be made because the CKD cache manager 16 can determine the offset of the first determined LBA including the requested CKD record from the starting LBA in the CKD track, which is provided in the LUN field 80 in the TDCB 70. The offset LBAs can then be divided by the LBAs per page to determine the page that includes the first LBA of the requested record. The page that includes the last LBA of the requested record may also similarly be determined. After determining the one or more pages that would include the requested CKD records, the CKD cache manager 16 would look at the corresponding entries for the determined one or more pages in the control block array 74.

If (at block 156) the one or more entries in the control block array 74 for the cache page(s) including the requested CKD record do not all have valid pointers to cache control blocks (CCB), then the CKD cache manager 16 would request (at block 158) from the SCSI cache manager 14 the determined LBAs and cache control block (CCB) in pages for which there is no cache control block entry in the control block array 74. Upon receiving (at block 160) the requested LBAs and pointer to each cache control block whose pointer is not included in the control block array 74, the CKD cache manager 16 inserts (at block 162) each returned pointer to a cache control block (CCB) into the entry in the control block array 74 corresponding to the cache page including the returned LBAs. The returned LBAs including the requested CKD record are then transferred (at block 164) to the application requesting the CKD record(s).

If (at block 156) each entry in the control block array 74 for the determined pages including the requested CKD record includes a valid cache control block (CCB) pointer, then the CKD manager 18 sends a request for the LBAs and the cache control block (CCB) pointers to the SCSI cache manager 14. The SCSI cache manager 14 would not need to access the cache directory 18 to determine the cache control blocks including the requested LBAs because the cache control block(s) (CCB) are provided by the CKD cache manager 16. The CKD cache manager 16 returns (at block 164) the received LBAs (at block 168).

The SCSI cache manager 14 is then called to access the LBAs including the CKD data even if the TDCB 70 contains valid CCB pointers and the LBAs are resident in cache 8 so that the SCSI cache manager 14 can increment its active users count 72. For instance, if there is no valid cache control block (CCB) pointer, then the CKD cache manager 16 calls the SCSI cache manager 14 with the first LBA and count of requested LBAs following the first LBA. In this case, the SCSI cache manager 14 allocates and initializes the cache control block (CCB), stages in the LBAs into cache 8, sets the cache control block (CCB) bitmaps for the staged data, grants access to the CKD cache manager 16, and calls the CKD cache manager 16 with successful completion.

If there is a valid cache control block (CCB), but not all requested LBAs are resident in cache 8, then the CKD cache manager 16 calls the SCSI cache manager 14 with the starting LBA, count of number of LBAs, and the cache control block (CCB) for each requested cache page. The SCSI cache manager 14 would then stage the missing LBAs into cache 8 and set the bitmap to indicate the LBAs that are staged into cache 8. The SCSI cache manager 14 grants access to the data and calls the CKD cache manager 16 with the successful completion notification. Still further, if there is a valid cache control block (CCB) and all requested LBAs are resident in cache 8, then the CKD cache manager 16 calls the SCSI cache manager 14 with the LBA, count, and cache control block (CCB) for each requested page. The SCSI cache manager 14 then grants access and calls the CKD cache manager 16 with completion.

To transfer the data, the caller of the CKD cache manager 16 may use the cache page index/pointers and set up a Direct Memory Access (DMA) operation for the protocol chip 26 to use to transfer data to the requesting host 4. After access is granted by the SCSI Cache Manager 14 and the CKD Cache Manager 16, the DMA transfer can proceed.

If the control block array 74 included pointers for some of the control blocks for pages including the requested data, but not all, then steps 158, 160, and 162 would be performed for those pages for which there are no control block pointers in the control block array 74 and step 166 is performed for those pages for which there are pointers to the control blocks.

Figure 6:
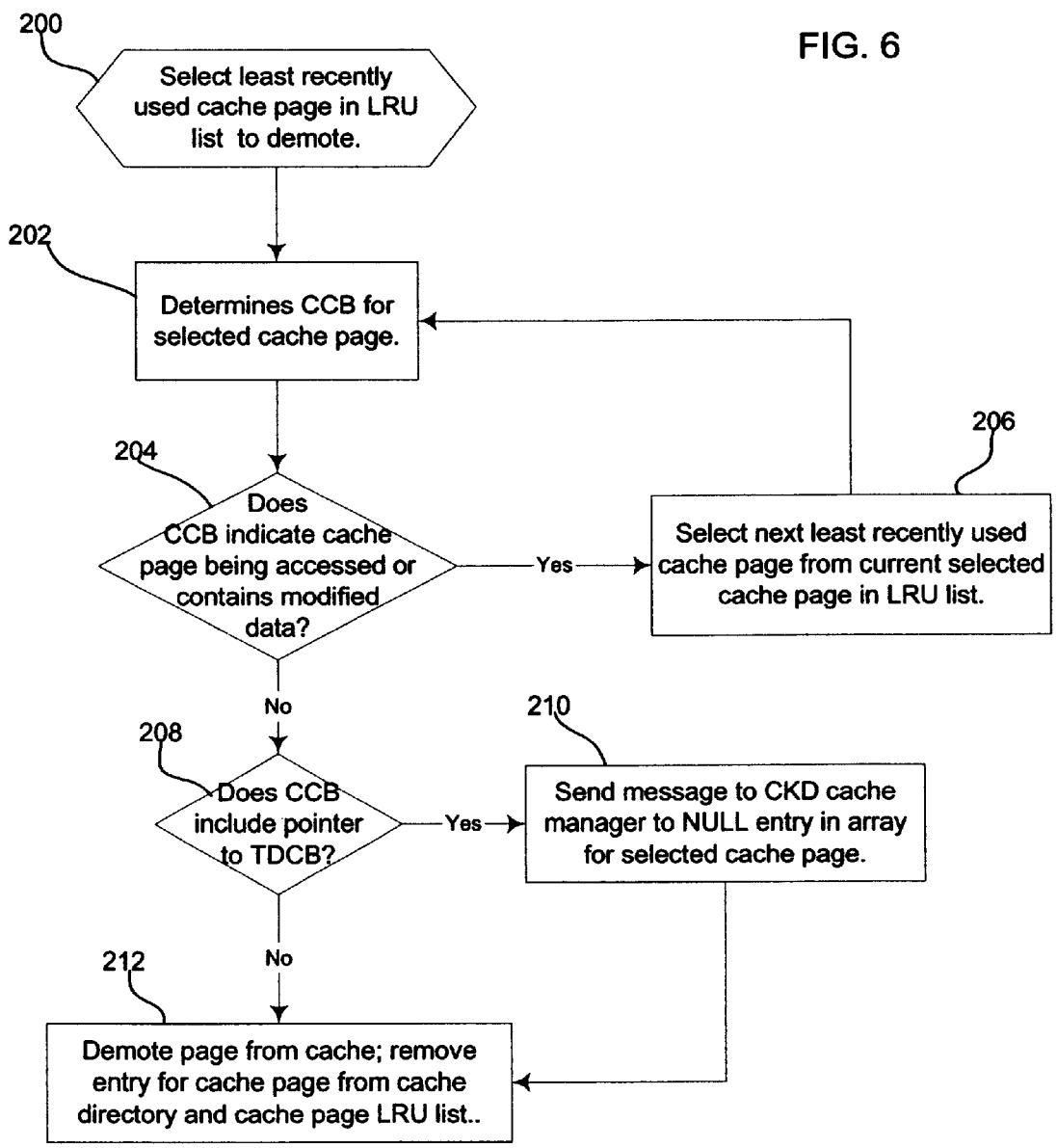
FIG. 6 illustrates logic implemented in a cache manager to demote a cache page in accordance with preferred embodiments of the present invention.

FIG. 6 illustrates logic implemented in the SCSI cache manager 14 to take into account the TDCB when demoting cache pages. Control begins at block 200 with the SCSI cache manager 14 initiating an operation to demote a least recently used cache page in a cache page LRU list 24. The SCSI cache manager 14 determines (at block 202) the cache control block (CCB) for the selected page to demote. If (at block 204) the accessed cache control block (CCB) indicates that the cache page is currently being accessed or the cache page contains modified data, then the SCSI cache manager 14 selects (at block 206) the next least recently used cache page form the currently selected cache page in the cache page LRU list 24 and proceeds back to block 202 to consider this next selected cache page. If (at block 204) the cache control block (CCB) indicates that no other process has access to the cache page, then the SCSI cache manager 14 determines (at block 208) whether the cache control block (CCB) includes a TDCB pointer indicating a TDCB 70 to which the cache page is associated. If the cache control block (CCB) includes a TDCB pointer, then the SCSI cache manager 14 sends (at block 210) a message to the CKD cache manager 16 to set to NULL the entry in the control block array 74 of the TDCB for the control block pointer of the selected page. If the cache control block (CCB) does not include a valid pointer to a TDCB (from the "No" branch of block 208) or after the entry in the TDCB control block array 74 corresponding to the selected page is set to NULL (at block 210), then the SCSI cache manager 14 demotes (at block 212) the selected page from cache 8 and removes the entry for the cache page from the cache directory 18 and cache page LRU list 24.

Figure 7:
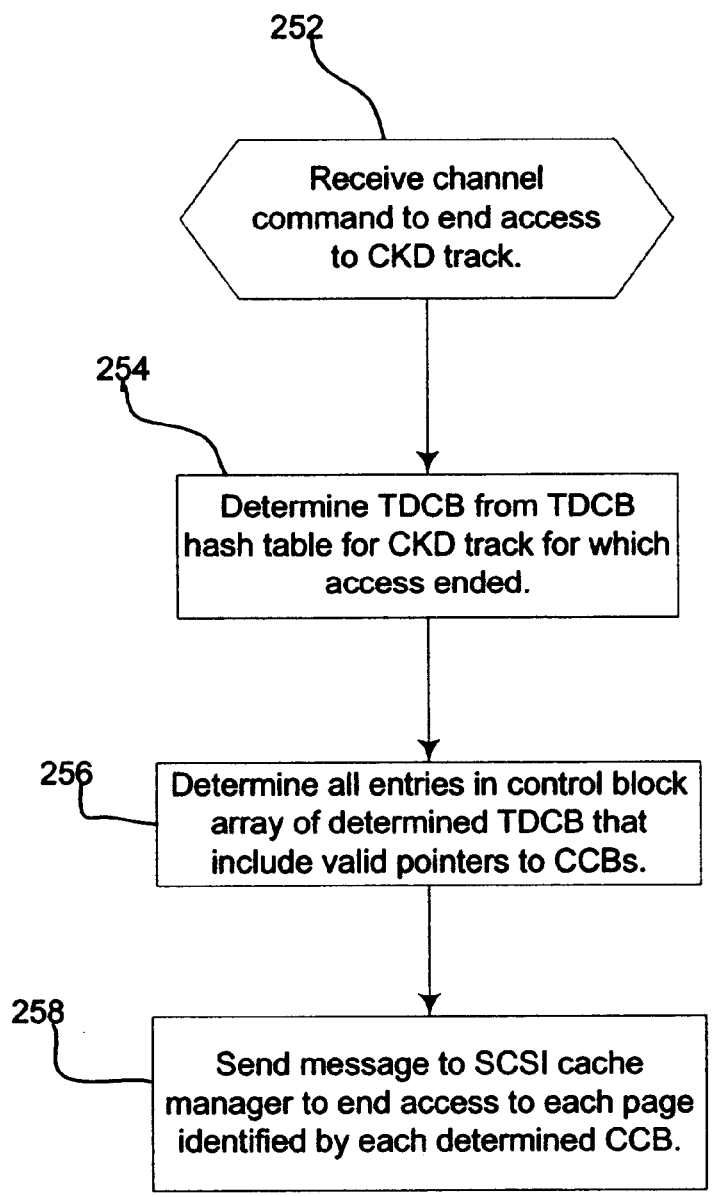
FIG. 7 illustrates logic to end access to a CKD track in accordance with preferred embodiments of the present invention.

FIG. 7 illustrates logic implemented in the CKD cache manager 16 to handle the end of a CKD track access. At block 250 in FIG. 7, the CKD cache manager 16 receives the command that the current access of the CKD track has ended. The CKD cache manager 16 determines (at block 252) the TDCB from the TDCB hash table 20 for the track to which access was ended. The CKD cache manager 16 then determines (at block 254) all entries in the control block array 74 of the determined TDCB that include valid cache control block (CCB) pointers. The CKD cache manager 16 sends (at block 256) a message to the SCSI cache manager 14 to end access to each page having a valid cache control block (CCB) pointer in the control block array 74. The cache control block (CCB) would include an active user count. When this count reaches zero, the SCSI cache manager 14 can then demote the page from cache 8 as there are no I/O requests accessing the page.

Preferred embodiments provide code to add to a SCSI controller 2 to enable the SCSI controller 14 to handle I/O requests for data in the CKD format as well as the SCSI format. The preferred embodiment code and data structures can function on top of the SCSI cache manager 14 code and data structures to provide an interface between CKD requests and the SCSI cache manager 14. Moreover, with the preferred embodiments, the CKD cache manager 14 utilizes the SCSI cache manager 14 and its data structures, such as the cache control block, to access the data in cache 8. Thus, preferred embodiments do not require significant modifications to the SCSI cache manager 14 code. This enables the CKD cache manager 16 code and related modifications to the SCSI cache manager 14 to be delivered as an update to the programmable memory in which the SCSI cache manager 14 and CKD cache manager 16 are implemented. In this way, current SCSI controllers can be readily updated to become immediately capable of handling CKD data requests.

With the preferred embodiment architecture, if SCSI data is received, then the existing SCSI cache manager 14 and hardware handles the I/O operation. If CKD data is received, then the CKD part of the protocol chip 26 and the CKD cache manager 16 handles the I/O utilizing the data structures described herein. For CKD operations, the CKD cache manager 16 calls the SCSI cache manager 14 to perform data operations in cache 8, such as demotion, staging, updates, etc.

The following describes some alternative embodiments.

The preferred embodiments may be implemented as a method, apparatus or program using standard programming and/or engineering techniques to produce software, firmware, hardware, or any combination thereof. The program, code and instructions in which the preferred embodiments are implemented are accessible from and embedded in an information bearing medium, which may comprise one or more computer-readable devices, firmware, programmable logic, memory devices (e.g., EEPROMs, ROMs, PROMs, RAMs, SRAMs, etc.), hardware, electronic devices, a computer readable magnetic storage unit (e.g., CD-ROM, floppy disk, hard disk drive, etc.), a file server providing access to the programs via a network transmission line, wireless transmission media, signals propagating through space, radio waves, infrared signals, etc. Of course, those skilled in the art will recognize that many modifications may be made to this configuration without departing from the scope of the present invention.

Preferred embodiments were described with respect to a storage controller, host, and DASD system. In alternative embodiments, the preferred embodiment commands may be used with any type of storage system arrangement, where one processing unit performs data operations with respect to a storage device by communicating with another processing unit that manages and controls access to the storage device. The storage device storing the data may be any storage device known in the art, including volatile and non-volatile storage devices, such as tape drives, flash memory, optical disk drives, etc. For instance, the commands may be used with any processor-to-processor communication, regardless of the environment in which the processors are implemented, i.e., the same computer, a network environment, etc.

Preferred embodiments were described with respect to providing an interface between a SCSI data storage and data records in the CKD record format, where user data is stored in CKD records on a track, such that each CKD record includes a count field and may include an key field. The preferred embodiment may apply to other data storage formats. For instance, the controller may store data in the storage device in formats other than SCSI and the requested data may be in formats other than CKD. Thus, the first data format may comprise any data format that is capable of being superimposed on a different second data storage format used by the storage device.

In summary, preferred embodiments disclose a system, method, program, and data structure for processing a request for data in a first format that is superimposed on blocks of data stored in a second format in a storage device. A data structure for a storage unit in the first format including the requested data is accessed. There is one data structure for each storage unit in the first format being accessed. Further, at least one cache page storing blocks of data in the second format is needed to store one storage unit in the first format. A determination is made of one or more storage blocks in the second format that include the requested data. A determination is also made as to whether the storage unit data structure includes a pointer to a control block for a cache page that would include the determined storage blocks in the second format. The determined pointer and a request for the determined storage blocks is transferred to a component that is capable of accessing storage blocks in the second format in cache using the control block if the storage unit data structure includes a pointer to the control block.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing a request for data in a first format that is superimposed on blocks of data stored in a second format in a storage device, comprising:

accessing a data structure for a storage unit in the first format including the requested data, wherein there is one data structure for each storage unit in the first format being accessed, and wherein at least one cache page storing blocks of data in the second format is needed to store one storage unit in the first format;

determining one or more storage blocks in the second format that include the requested data;

determining whether the storage unit data structure includes a pointer to a control block for a cache page that would include the determined storage blocks in the second format; and transferring the determined pointer and a request for the determined storage blocks to a component that is capable of accessing storage blocks in the second format in cache using the control block if the storage unit data structure includes a pointer to the control block.

2. The method of claim 1, wherein the first format comprises a count-key-data (CKD) format, the second format comprises the Small Computer System Interface (SCSI) format, the storage unit comprises a CKD record, and the blocks of data stored in the second format comprise fixed block address (FBA) blocks.

3. The method of claim 1, wherein the component capable of accessing storage blocks in the cache comprises a cache manager.

4. The method of claim 3, further comprising:

transferring a request for the determined storage blocks to the cache manager if the storage unit data structure does not include a pointer to the control block;

accessing, with the cache manager, the control block for the cache page that includes the requested data;

using, with the cache manager, the accessed control block to access the requested storage blocks from the cache page; and returning, with the cache manager, the accessed storage blocks.

5. The method of claim 3, wherein accessing, with the cache manager, the control block for the determined page further comprises:

determining whether there is one control block for the cache page including the requested storage blocks;

if there is no control block for the cache page including the requested storage blocks, performing:
   (i) allocating a cache page in cache for the requested data;
   (ii) staging the requested data into the allocated cache page;
   (ii) generating one control block for the allocated cache page;
   (iii) accessing the requested storage blocks in the allocated cache page; and
   (iv) returning the accessed storage blocks and the generated control block data.

6. The method of claim 3, further comprising:

returning, with the cache manger, one pointer to the accessed control block providing information on the cache page including the requested data;

receiving the returned pointer to the control block; and indicating in the storage unit data structure the returned pointer to the control block data for the page including the requested data, wherein the pointer in the storage unit data structure is subsequently used to access further requested data in the first format in the page.

7. The method of claim 3, wherein accessing the storage unit data structure further comprises:

determining whether a storage unit table indicates a pointer to one storage unit data structure for the storage unit including the requested data in the first format; and if one pointer is provided, using the pointer in the storage unit table to access the storage unit data structure.

8. The method of claim 7, further comprising:

allocating a storage unit data structure for the storage unit including the requested data in the first format if the storage unit table does not indicate one pointer;

incrementing an active user count in the allocated storage unit data structure;

if no storage unit data structures are available for allocation, selecting one currently used storage unit data structure having an active user count of zero to demote and allocate as the storage unit data structure for the storage unit including the requested data in the first format.

9. The method of claim 3, wherein the control block includes a field for a pointer to one storage unit data structure, wherein the cache page associated with the control block data structure includes data for the storage unit associated with the storage unit data structure addressed by the pointer in the control block data structure, further comprising:

demoting, with the cache manager, one cache page in cache;

sending a message, with the cache manager, indicating one storage unit data structure and the control block for the cache page demoted; and in response to the message, nullifying the pointer in the storage unit data structure to the control block for the demoted cache page if the storage unit data structure includes the pointer.

10. The method of claim 3, further comprising:

receiving a request to end access to the storage unit from which data was requested;

sending a message to the cache manger indicating each control block addressed by one pointer in the storage unit data structure to which access has ended;

decrementing, with the cache manager, an active user count for each control block indicated in the message, wherein the cache manager demotes pages having the active user count of zero.

11. A system for processing a request for data, comprising:

a storage device storing the requested data in a first format superimposed on blocks of data stored in a second format;

a cache;

a processing unit in communication with the storage device and cache;

program logic executed by the processing unit to perform:
(i) accessing a data structure for a storage unit in the first format including the requested data, wherein there is one data structure for each storage unit in the first format being accessed, and wherein at least one cache page in the cache storing blocks of data in the second format is needed to store one storage unit in the first format;
(ii) determining one or more storage blocks in the second format that include the requested data;
(iii) determining whether the storage unit data structure includes a pointer to a control block for a cache page in the cache that would include the determined storage blocks in the second format; and
(iv) transferring the determined pointer and a request for the determined storage blocks to a component that is capable of accessing storage blocks in the second format in the cache using the control block if the storage unit data structure includes a pointer to the control block.

12. The system of claim 11, wherein the first format comprises a count-key-data (CKD) format, the second format comprises the Small Computer System Interface (SCSI) format, the storage unit comprises a CKD record, and the blocks of data stored in the second format comprise fixed block address (FBA) blocks.

13. The system of claim 11, wherein the program logic component capable of accessing storage blocks in the cache comprises a cache manager and wherein the program logic component that accesses the data structure for the storage unit, determines one or more storage blocks in the second format that include the requested data, determines whether the storage unit data structure includes a pointer, and transfers the determined pointer and a request for the determined storage blocks to the cache manager comprises a data manager.

14. The system of claim 13, further comprising:

transferring, with the data manager, a request for the determined storage blocks to the cache manager if the storage unit data structure does not include a pointer to the control block;

accessing, with the cache manager, the control block for the cache page that includes the requested data;

using, with the cache manager, the accessed control block to access the requested storage blocks from the cache page; and returning, with the cache manager, the accessed storage blocks.

15. The system of claim 13, wherein accessing, with the cache manager, the control block for the determined page further comprises:

determining whether there is one control block for the cache page including the requested storage blocks;

if there is no control block for the cache page including the requested storage blocks, performing:
(i) allocating a cache page in cache for the requested data;
(ii) staging the requested data into the allocated cache page;
(ii) generating one control block for the allocated cache page;
(iii) accessing the requested storage blocks in the allocated cache page; and
(iv) returning the accessed storage blocks and the generated control block data.

16. The system of claim 13, further comprising:

returning, with the cache manger, one pointer to the accessed control block providing information on the cache page including the requested data;

receiving, with the data manager, the returned pointer to the control block; and indicating, with the data manager, in the storage unit data structure the returned pointer to the control block data for the page including the requested data, wherein the pointer in the storage unit data structure is subsequently used to access further requested data in the first format in the page.

17. The system of claim 13, wherein accessing the storage unit data structure with the data manager further comprises:

determining whether a storage unit table indicates a pointer to one storage unit data structure for the storage unit including the requested data in the first format; and if one pointer is provided, using the pointer in the storage unit table to access the storage unit data structure.

18. The system of claim 13, wherein the data manager further performs:

allocating a storage unit data structure for the storage unit including the requested data in the first format if the storage unit table does not indicate one pointer;

incrementing an active user count in the allocated storage unit data structure; and if no storage unit data structures are available for allocation, selecting one currently used storage unit data structure having an active user count of zero to demote and allocate as the storage unit data structure for the storage unit including the requested data in the first format.

19. The system of claim 13, wherein the control block includes a field for a pointer to one storage unit data structure, wherein the cache page associated with the control block data structure includes data for the storage unit associated with the storage unit data structure addressed by the pointer in the control block data structure, further comprising:

demoting, with the cache manager, one cache page in cache;

sending a message, with the cache manager, indicating one storage unit data structure and the control block for the cache page demoted; and in response to the message, nullifying, with the data manager, the pointer in the storage unit data structure to the control block for the demoted cache page if the storage unit data structure includes the pointer.

20. The system of claim 13, further comprising:

receiving, with the data manager, a request to end access to the storage unit from which data was requested;

sending, with the data manager, a message to the cache manger indicating each control block addressed by one pointer in the storage unit data structure to which access has ended;

decrementing, with the cache manager, an active user count for each control block indicated in the message, wherein the cache manager demotes pages having the active user count of zero.

21. A program for processing a request for data in a first format that is superimposed on blocks of data stored in a second format in a storage device, wherein the program is embedded in a computer readable medium and includes code capable of causing at least one processor to perform:

accessing a data structure for a storage unit in the first format including the requested data, wherein there is one data structure for each storage unit in the first format being accessed, and wherein at least one cache page storing blocks of data in the second format is needed to store one storage unit in the first format;

determining one or more storage blocks in the second format that include the requested data;

determining whether the storage unit data structure includes a pointer to a control block for a cache page that would include the determined storage blocks in the second format; and transferring the determined pointer and a request for the determined storage blocks to a component that is capable of accessing storage blocks in the second format in cache using the control block if the storage unit data structure includes a pointer to the control block.

22. The program of claim 21, wherein the first format comprises a count-key-data (CKD) format, the second format comprises the Small Computer System Interface (SCSI) format, the storage unit comprises a CKD record, and the blocks of data stored in the second format comprise fixed block address (FBA) blocks.

23. The program of claim 21, wherein the program code capable of accessing storage blocks in the cache comprises a cache manager component and wherein the program code that accesses the data structure for the storage unit, determines one or more storage blocks in the second format that include the requested data, determines whether the storage unit data structure includes a pointer, and transfers the determined pointer and a request for the determined storage blocks to the cache manager comprises a data manager component.

24. The program of claim 23, wherein the data manager code is further capable of causing at least one processor to perform transferring a request for the determined storage blocks to the cache manager if the storage unit data structure does not include a pointer to the control block; and wherein the cache manager code is further capable of causing at least one processor to perform:

(i) accessing the control block for the cache page that includes the requested data;

(ii) using the accessed control block to access the requested storage blocks from the cache page; and (iii) returning the accessed storage blocks.

25. The program of claim 23, wherein accessing, with the cache manager, the control block for the determined page further comprises:

determining whether there is one control block for the cache page including the requested storage blocks;

if there is no control block for the cache page including the requested storage blocks, performing:

(i) allocating a cache page in cache for the requested data;

(ii) staging the requested data into the allocated cache page;

(ii) generating one control block for the allocated cache page;

(iii) accessing the requested storage blocks in the allocated cache page; and (iv) returning the accessed storage blocks and the generated control block data.

26. The program of claim 23, wherein the cache manager code is further capable of causing the at least one processor to perform returning one pointer to the accessed control block providing information on the cache page including the requested data; and wherein the data manager code is further capable of causing the at least one processor to perform:

(i) receiving the returned pointer to the control block; and (ii) indicating in the storage unit data structure the returned pointer to the control block data for the page including the requested data, wherein the pointer in the storage unit data structure is subsequently used to access further requested data in the first format in the page.

27. The program of claim 23, wherein accessing the storage unit data structure further comprises:

determining whether a storage unit table indicates a pointer to one storage unit data structure for the storage unit including the requested data in the first format; and if one pointer is provided, using the pointer in the storage unit table to access the storage unit data structure.

28. The program of claim 27, wherein the data manager code is further capable of causing the at least one processor to perform allocating a storage unit data structure for the storage unit including the requested data in the first format if the storage unit table does not indicate one pointer;

incrementing an active user count in the allocated storage unit data structure;

if no storage unit data structures are available for allocation, selecting one currently used storage unit data structure having an active user count of zero to demote and allocate as the storage unit data structure for the storage unit including the requested data in the first format.

29. The program of claim 23, wherein the control block includes a field for a pointer to one storage unit data structure, wherein the cache page associated with the control block data structure includes data for the storage unit associated with the storage unit data structure addressed by the pointer in the control block data structure, wherein the cache manager code is further capable of causing the at least one processor to perform demoting one cache page in cache and sending a message indicating one storage unit data structure and the control block for the cache page demoted; and wherein the data manager code is further capable of causing the at least one processor to perform, in response to the message, nullifying the pointer in the storage unit data structure to the control block for the demoted cache page if the storage unit data structure includes the pointer.

30. The program of claim 23, wherein the data manager code is further capable of causing the at least one processor to perform receiving a request to end access to the storage unit from which data was requested and sending a message to the cache manger indicating each control block addressed by one pointer in the storage unit data structure to which access has ended; and wherein the cache manager code is further capable of causing the at least one processor to perform decrementing an active user count for each control block indicated in the message, wherein the cache manager demotes pages having the active user count of zero.

31. A computer readable medium containing at least one data structure for use in processing a request for data in a first format that is superimposed on blocks of data stored in a second format in a storage device, comprising:

a data structure for a storage unit in the first format including the requested data, wherein there is one data structure for each storage unit in the first format being accessed, wherein at least one cache page storing blocks of data in the second format is needed to store one storage unit in the first format, wherein the storage unit data structure is capable of including a pointer to a control block for a cache page that includes the requested data in storage blocks in the second format, and wherein the pointer and the request for the storage blocks are transferred to a component that is capable of accessing storage blocks in the second format in cache using the control block.

32. The computer readable medium of claim 31, wherein the first format comprises a count-key-data (CKD) format, the second format comprises the Small Computer System Interface (SCSI) format, the storage unit comprises a CKD record, and the blocks of data stored in the second format comprise fixed block address (FBA) blocks.

33. The computer readable medium of claim 31, further comprising:

a storage unit table including at least one pointer to one storage unit data structure for the storage unit including the requested data in the first format; wherein the pointer in the storage unit table is used to access the storage unit data structure.

34. The computer readable medium of claim 31, wherein the control block includes a field for a pointer to one storage unit data structure, wherein the cache page associated with the control block data structure includes data for the storage unit associated with the storage unit data structure addressed by the pointer in the control block data structure, wherein the pointer in the storage unit data structure to the control block is nullified if the cache page identified by the control block is demoted.

* * * * *